Sept. 1, 1931.   W. G. HASLEY   1,821,707
FILTERING APPARATUS
Filed Sept. 27, 1929
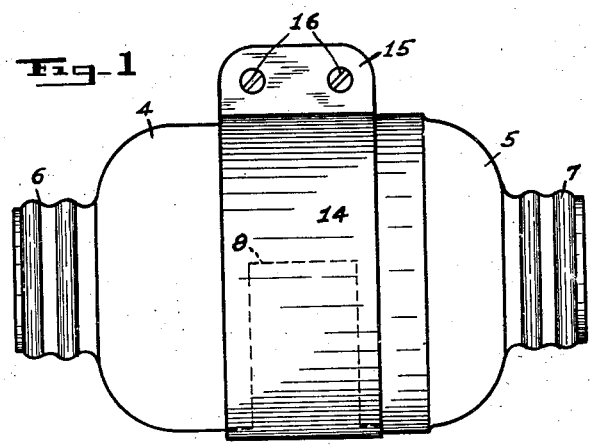
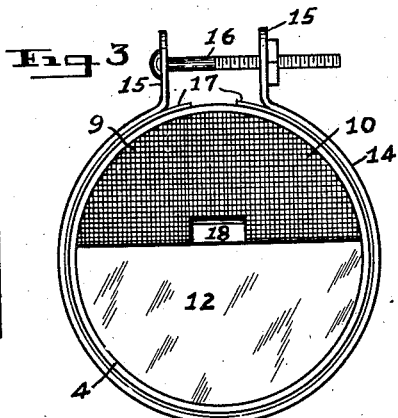
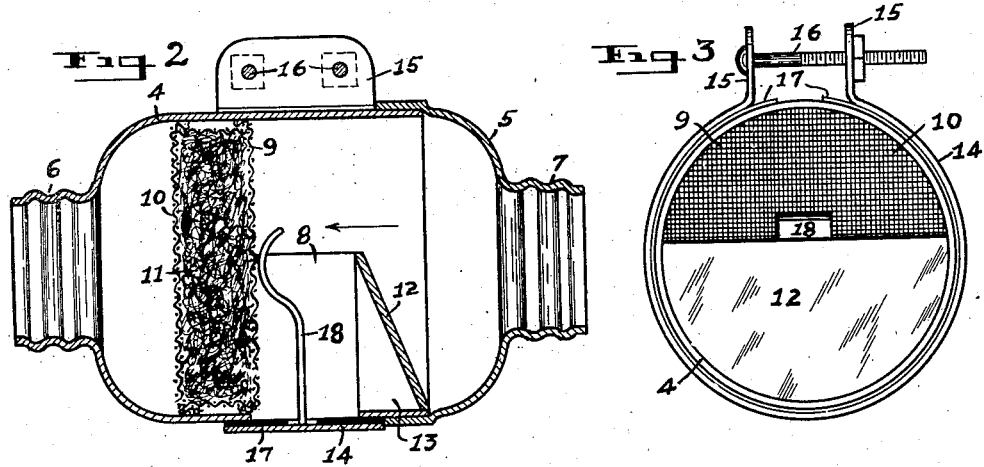
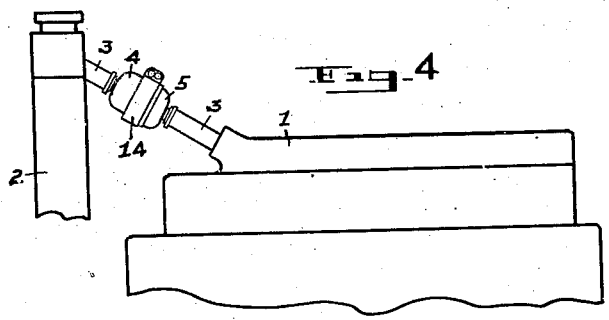
INVENTOR
William G. Hasley
By Jas R Snyder
Attorney Patented Sept. 1, 1931

1,821,707

UNITED STATES PATENT OFFICE

WILLIAM G. HASLEY, OF PITTSBURGH, PENNSYLVANIA, ASSIGNOR OF ONE-THIRD TO JOHN H. DOWNES, OF PITTSBURGH, PENNSYLVANIA

FILTERING APPARATUS

Application filed September 27, 1929. Serial No. 395,529.

My invention relates to a filtering apparatus, and while primarily intended for use in connection with the water cooling system of a motor vehicle engine, it will be obvious that the device may be employed for any other purposes wherein it is found to be applicable.

The primary object of the invention is to provide a filtering apparatus of the character described, which will function automatically to collect and trap all dirt, sediment, scale or any other extraneous matter from the water utilized in the cooling system of an internal combustion engine, thereby preventing clogging of the radiator or of any other conduits of the circulating cooling system, and permitting an unobstructed and vigorous circulation of water promoting the efficiency of the engine.

Other important objects of the invention are to provide a device of the class stated which may be readily installed in any type of water cooled internal combustion engine already constructed as well as form a component part of a new engine structure, which embodies novel means for removing the accumulated matter therefrom, which is simple in its construction and arrangement, strong, durable and efficient in its use, compact, attractive in appearance, positive in its action, and comparatively inexpensive to manufacture, install and maintain.

With the foregoing and other objects in view which will appear as the description proceeds, the invention resides in the combination and arrangement of parts and in the details of construction hereinafter described and claimed, it being understood that changes in the precise embodiment of the invention hereinafter disclosed can be made within the scope of what is claimed without departing from the spirit of the invention.

In the drawings wherein like numerals of reference designate corresponding parts throughout the several views:—

Figure 1 is a side view of a filtering apparatus constructed in accordance with the invention.

Figure 2 is a longitudinal cross sectional view thereof.

Figure 3 is an end view of the device with end cap removed therefrom.

Figure 4 is a side view illustrating the adaptation of the filtering apparatus with an internal combustion engine.

Referring in detail to the drawings, 1 denotes an internal combustion engine including a radiator 2 and of a construction commonly employed for motor vehicles.

My improved filtering apparatus is preferably mounted and connected in the supporting hose 3, which establishes communication between the water jacket at the top of the engine 1 and the top of the radiator 2 in the usual manner.

The filtering apparatus comprising a hollow, cylindrical casing or body portion 4 including an end cap 5, which is fixed, in any suitable manner, to the rearward end of the body portion 4. The ends of the body portion 4 are formed to provide a pair of reduced necks, respectively indicated at 6 and 7. The necks 6 and 7 are preferably provided with circumferentially extending corrugations to facilitate the establishment of watertight clamped connections thereof with the supporting hose 3, as clearly shown in Figure 4.

The body portion 4 is provided with a large centrally disposed opening 8, which is disposed circumferentially and extends approximately one-half the distance around the body portion 4, at the lower side of the latter.

A cylindrical filtering element 9 is removably mounted in the body portion 4 directly forward of the opening 8. The size of the latter is ample to permit the removal or replacement of the filtering element 9 therethrough, when required.

The cylindrical filtering element 9 comprises a closed container 10, which is preferably constructed of non-corrosive, fine mesh wire, or from any other suitable foraminous material. The container 10 is stuffed or filled with a filtering agent 11 in the form of hair and the like, or any other suitable material, which is not impervious to the passage of water and which will not deteriorate by constant immersion in the latter. The purpose of the filtering agent 11 is to collect the minute particles of extraneous matter from the water on the passage of the latter therethrough.

A baffle plate 12 is permanently fixed in the body portion 4, and is of a size approximately commensurate to one-half the transverse area of the latter, as clearly shown in Figure 3. The baffle plate 12 extends transversely and is directly rearward of the opening 8. The baffle plate 12 is disposed at an angle, having its top edge disposed forwardly of the lower end thereof. It will be noted that the terms "forwardly" and "rearwardly" is applied herein relatively to the direction of flow of the water through the filtering apparatus as indicated by an arrow, and with respect to its relative position with the disposition of the engine 1.

In the circulating cooling system the water circulates through the engine 1, passes through the supporting hose 3 and the filtering apparatus carried by the latter, and through the radiator 2. Consequently, all water must pass over the baffle plate 12 before it strikes the filtering element 9. Any foreign matter in the water that cannot pass into the container 10 will settle in the trap 13, which constitutes that portion of the body portion 4 disposed between the rear end of the container 10 and the forward side of the baffle plate 12. The angular disposition of the baffle plate 12 prevents the return of any trapped matter into circulating water.

A resilient cover band 14, for closing the opening 8, surrounds the body portion 4. The ends of the cover band 14 are formed to provide apertured lugs 15, which are provided with a pair of screw bolts 16. The positioning of the cover band 14 is facilitated by its abutment against the forward end of the end cap 5.

A band gasket 17, of any suitable material, namely cork, rubber and the like, is interposed between the periphery of the body portion 4 and the inner face of the cover band 14. The adjustment of the screw bolts 16 will securely clamp the cover band 14, together with the band gasket 17, around the body portion 4 and thereby prevent leakage through the opening 8.

A vertically disposed, resilient finger 18 is fixed to the inner side of the cover band 14 centrally of the length thereof. The finger 18 projects into the body portion 4, through the gasket 17 and the opening 8, and engages the rear end of the filtering apparatus for maintaining the latter in position in the body portion 4.

Any accumulation of extraneous matter deposited in the trap 13 may readily be removed from the latter by the removal of the cover band 14 and gasket 17, as the latter virtually constitutes the bottom of the trap 13.

It is, of course, evident that the body portion 4 may be formed integral, but the provision of the end cap 5 facilitates the assembly of the baffle plate 12 in the body portion 4. Further, it will be apparent that my improved filtering apparatus may be positioned at any desired point of circulating system to best meet conditions found in practice.

The present invention provides a most efficient device of its kind for maintaining the water of a circulating cooling system free from all impurities and matter tending to obstruct its free and uninterrupted circulation.

What I claim is:

1. In combination, a filtering apparatus of the character described comprising a cylindrical hollow body portion having its ends formed to provide reduced necks, said body portion further provided with a circumferentially extending opening at the lower side thereof, a filtering element mounted in said body portion through said opening and disposed forwardly of the latter, a baffle plate fixed in said body portion rearwardly of said opening and providing a trap between said filtering element and said baffle plate, a removable closure member for covering said opening, and means carried by said closure member and engaging said filtering element for maintaining the latter in position in said body portion.

2. In combination, a filtering apparatus of the character described comprising a cylindrical hollow body portion having its ends formed to provide corrugated reduced necks, said body portion provided with a circumferentially extending opening at the lower side thereof, a removable filtering element removably mounted in said body portion forwardly of said opening, an angularly disposed baffle plate fixed in said body portion rearwardly of said opening, a closure band removably clamped around said body portion for covering said opening, a gasket interposed between said band and said body portion, and a resilient finger carried by said band and engaging said filtering element for maintaining the latter in position in said body portion.

In testimony whereof I affix my signature.

WILLIAM G. HASLEY.